No. 888,244. PATENTED MAY 19, 1908.
F. LUCAS.
FRICTION CLUTCH.
APPLICATION FILED OCT. 19, 1907.
2 SHEETS—SHEET 1.
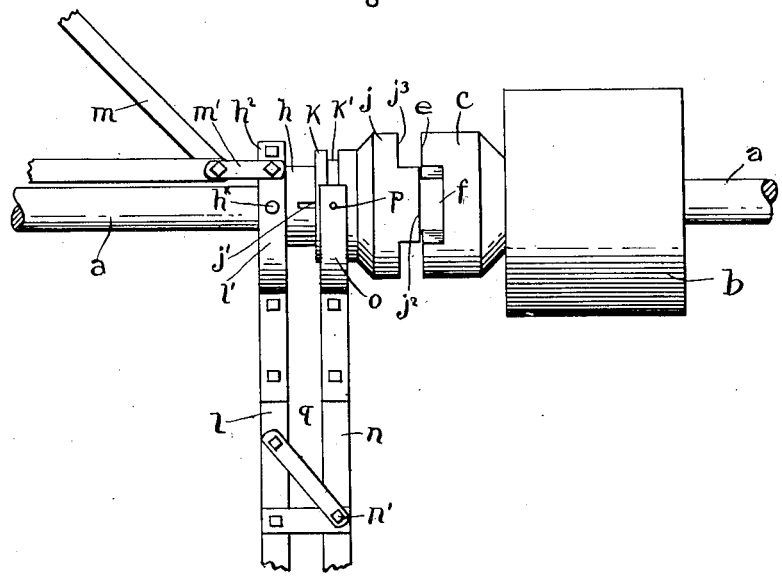
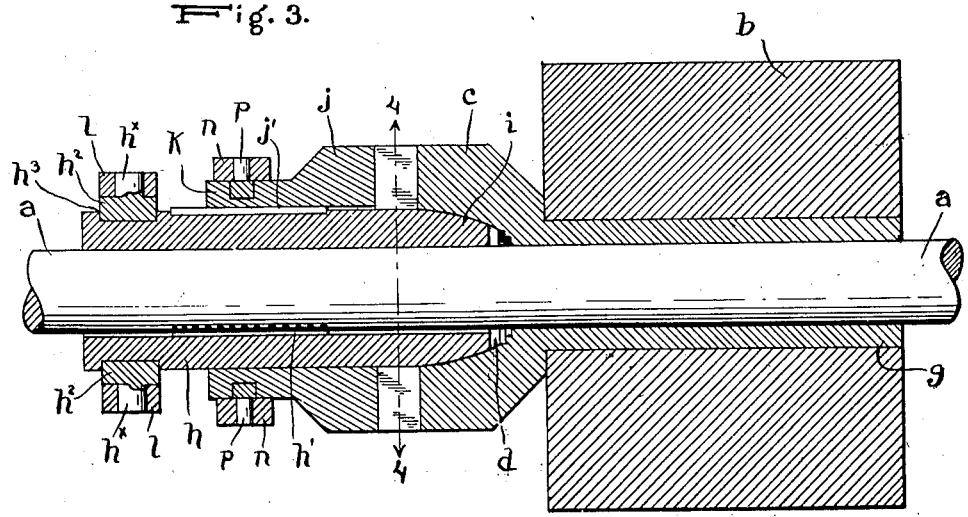
Witnesses
Stuart Hilder.
George M. Anderson.
Inventor
Frank Lucas
by E. W. Anderson
his Attorney No. 888,244. PATENTED MAY 19, 1908.
F. LUCAS.
FRICTION CLUTCH.
APPLICATION FILED OCT. 19, 1907.
2 SHEETS—SHEET 2.
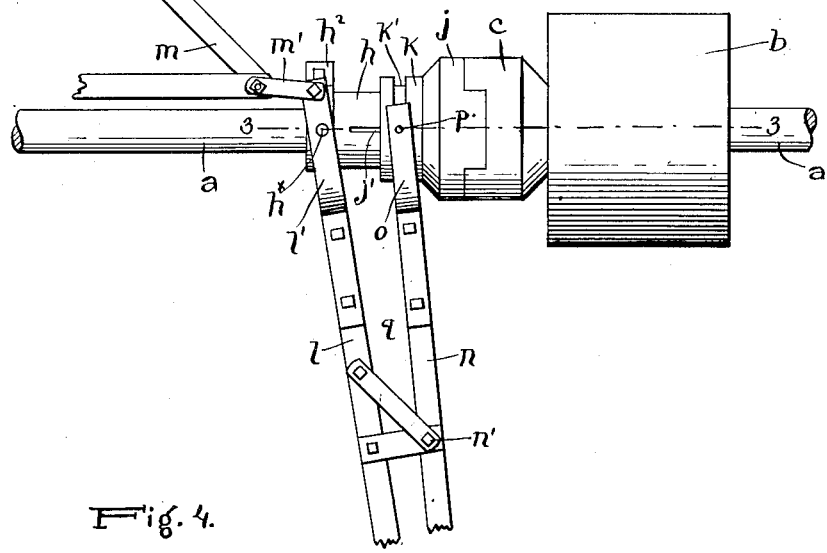
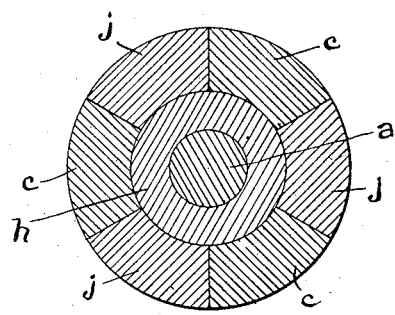
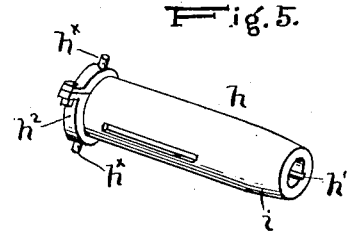
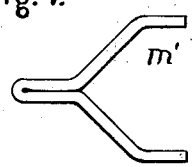
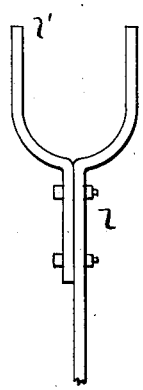
Witnesses
Stuart Hilder.
George M. Anderson.
Inventor
Frank Lucas
by E. W. Anderson
his Attorney

UNITED STATES PATENT OFFICE.

FRANK LUCAS, OF SIDNEY, OHIO.

FRICTION-CLUTCH.

No. 888,244.  Specification of Letters Patent.  Patented May 19, 1908.

Application filed October 19, 1907. Serial No. 398,274.

*To all whom it may concern:*

Be it known that I, FRANK LUCAS, a citizen of the United States, resident of Sidney, in the county of Shelby and State of Ohio, have made a certain new and useful Invention in Friction-Clutches; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention with the members of the clutch disengaged. Fig. 2 is a similar view with the members engaged. Fig. 3 is a section on the line 3—3, Fig. 2. Fig. 4 is a section on the line 4—4, Fig. 3. Fig. 5 is a detail view of the cylinder casting. Fig. 6 is a detail fragmentary view of one of the levers. Fig. 7 is a detail view of the link.

The invention relates to friction clutches and it consists in the novel construction and combinations of parts as hereinafter set forth.

In the accompanying drawings, illustrating the invention, the letter $a$, designates the rotary shaft carrying the loose driving pulley $b$.

$c$, is the loose clutch member provided with a central recess $d$, having the shape of a section of a cone, and with wedge or miter-form projections $e$, and recesses $f$, of similar form, this loose member having also a longitudinal central projection $g$, which engages the pulley $b$, in a fast manner.

A cylindrical casting $h$, fits upon the shaft $a$, in a slidable manner, having a spline engagement therewith as shown at $h'$, this casting having an end portion $i$, of the form of the section of a cone and designed to have engagement with the recess $d$, of the loose clutch member. The fast clutch member proper, $j$, is mounted in a slidable manner upon the casting $h$, having spline engagement therewith as shown at $j'$, and is provided with wedge or miter-form projections $j^2$, and recesses $j^3$, of similar form designed for engagement with the recesses and projections of the loose member $c$. The part $j$, has an extension $k$, provided with an annular groove $k'$, and the casting $h$, has diametrically opposite journal projections $h^\times$, carried by a rotatable annulus $h^2$, engaging a groove $h^3$, of such casting. $l$, is a lever device having a forked upper end portion $l'$, having fulcrum engagement at the free ends of the forks with a pivotal link $m'$, of a stationary bracket device $m$, such forks embracing the casting $h$, and having pivotal engagement intermediately thereof with the journal projections $h^\times$.

$n$, is a second lever device having fulcrum connection at $n'$, with the lever $l$, and provided with a forked upper end portion $o$, embracing the extension $k$, of the part $j$, such forked portion having diametrically opposite pins $p$, engaging the annular groove $k'$, of the extension.

Thus upon movement of the handle portion of the lever $l$, to the right, the casting or carrier $h$, is moved to the right to cause engagement of the conical surfaces of casting $h$, and loose member $c$, and consequent gradually increasing rotation of the casting $h$, until it reaches the speed of the power or line shaft. The lever $l$, having been first operated as above stated to start the rotation of the casting $h$, the handle portion of the lever $n$, is next moved to the left (an interval $q$ between such levers allowing this opposite movement thereof) which causes the member $j$, to move to the right upon the shaft and effects the engagement of the jaws of the members $j$, and $c$. The casting $h$, is thus gradually started in rotation as are also the clutch members, without shock or jar. The handle portions of the two levers $l$, and $n$, may be moved oppositely at practically the same time to effect the clutch, as the casting $h$, is started in rotation at once and the clutch of the members closely follows.

Having described the invention, what I claim and desire to secure by Letters Patent is:

1. In a friction clutch, a rotary shaft, a loose clutch member, a fast clutch member slidable upon said shaft and composed of a frictional driving section and a positive driving section, said frictional driving section being capable of engagement with the loose clutch member to start the same in rotation, said positive driving section and loose clutch member having opposing jaws capable of meshing together to form a positive driving connection, a lever device for moving said frictional driving section and a second lever device having fulcrum engagement with the first lever device for moving said positive driving section.

2. In a friction clutch, a rotary shaft, a pulley loosely mounted thereon, and carrying fast thereto a loose clutch member provided with a central conical recess, a cylindrical casting fast upon said shaft and having a slidable engagement therewith, said casting having an end portion of conical form capable of engagement with said central recess, a fast clutch member having slidable engagement with said casting, said fast clutch member and loose clutch member having opposing jaws capable of meshing together, a lever device for moving said casting upon the shaft, and a second lever device having fulcrum engagement with the first lever device for moving the fast clutch member upon the casting.

3. In a friction clutch, a rotary shaft, a pulley loosely mounted thereon, and carrying fast thereto a loose clutch member provided with a central conical recess, a cylindrical casting fast upon said shaft and having a slidable engagement therewith, said casting having an end portion of conical form capable of engagement with said central recess, a fast clutch member having slidable engagement with said casting, said fast clutch member and loose clutch member having opposing jaws capable of meshing together, a lever device having a forked upper end provided with an end fulcrum connection with a stationary bracket, and intermediate pivotal connection with said casting, and a second lever device having a fulcrum connection with the first lever device and having a forked upper end provided with a slidable pivotal connection with the fast clutch member.

In testimony whereof I affix my signature, in presence of two witnesses.

FRANK LUCAS.

Witnesses:
D. OLDHAM,
JOHN OLDHAM.